W. NOTMAN.
Ridge Plow.
No. 84,437.
Patented Nov. 24, 1868.
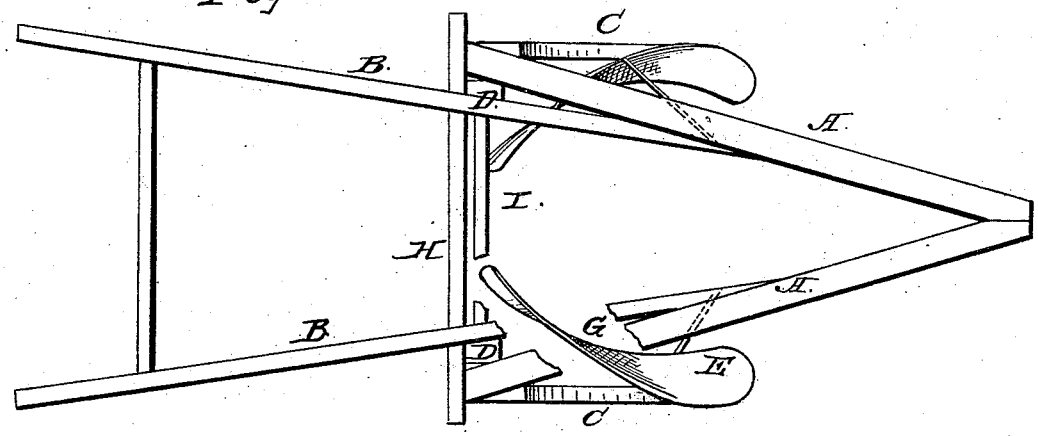
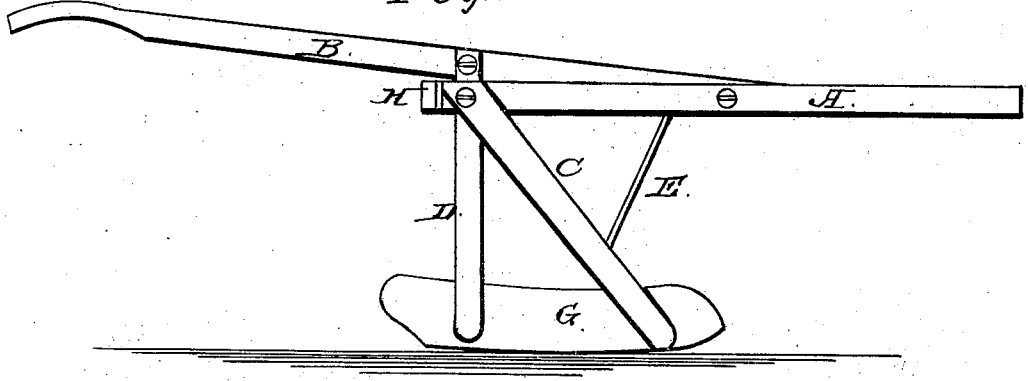

United States Patent Office.

WALTER NOTMAN, OF DEERFIELD, OHIO.

Letters Patent No. 84,437, dated November 24, 1868.

IMPROVEMENT IN CORN AND POTATO-PLOW.

The Schedule referred to in these Letters Patent and making part of the same.

*To all whom it may concern:*

Be it known that I, WALTER NOTMAN, of Deerfield, in the county of Portage, and State of Ohio, have invented a new and useful Improvement in Corn and Potato-Hilling Plow; and I do hereby declare that the following is a full, clear, and exact description thereof, which will enable others skilled in the art to make and use the same, reference being had to the accompanying drawings, forming part of this specification, in which—

Figure 1 is a plan view of my invention, in which a portion of the frame-work on one side is broken away, to exhibit the form of the mould-boards.

Figure 2 is a side view of the same.

Similar letters of reference indicate like parts.

The object of this invention is to provide a simple and effective plow or cultivator for hilling up corn and potatoes or other growth for which it is adapted.

The invention consists in the arrangement of parts, as will be hereinafter more fully described.

In the drawings—

A A are two pieces, affixed to a cross-piece, H, and joined together in front in the form of the letter v.

B B are handles, affixed to the frame, as shown.

The uprights D are affixed to the frame A and to the handles B, between which they are located.

C are braces, the lower ends of which are affixed to the front ends of the mould-boards G. These braces, in practice, are of iron, and their upper ends are affixed to the frame A, as shown.

E are auxiliary iron braces, to sustain the uprights D and the braces C, and are affixed to the frame A and to braces C, as shown.

I is a brace, between the handles, to keep them from springing from the uprights D, when any lateral strain acts upon the latter.

The mould-boards G are of metal, and are each bent or twisted to form a warped surface, as shown, and are arranged with their front ends diverging, as shown. The rear ends approach each other, and thus act to deliver the soil gathered up by the front ends upon the row, between the two mould-boards.

The team is hitched to the front end of the frame A, and the attendant walks on either side of the row, guiding the apparatus by one of the handles B.

I am aware of the patent granted to John Kurtz, July 16, 1867, for an improved cultivator, but I claim nothing therein shown, as it forms no part of my invention.

Having thus described my invention,

I claim as new, and desire to secure by Letters Patent—

The mould-boards G, of the twisted and bent form, as shown, combined and arranged with the v-shaped frame A, cross-pieces H, uprights D, and braces C L I, which parts are firmly secured to each other, as herein represented and described, and for the purpose specified.

WALTER NOTMAN.

Witnesses:
PETER HAGLEY,
JOHN HAGLEY.